May 13, 1924.
W. R. EDWARDS
1,493,483
CLAMPING MECHANISM FOR SHEARING MACHINES
Filed Oct. 18, 1920
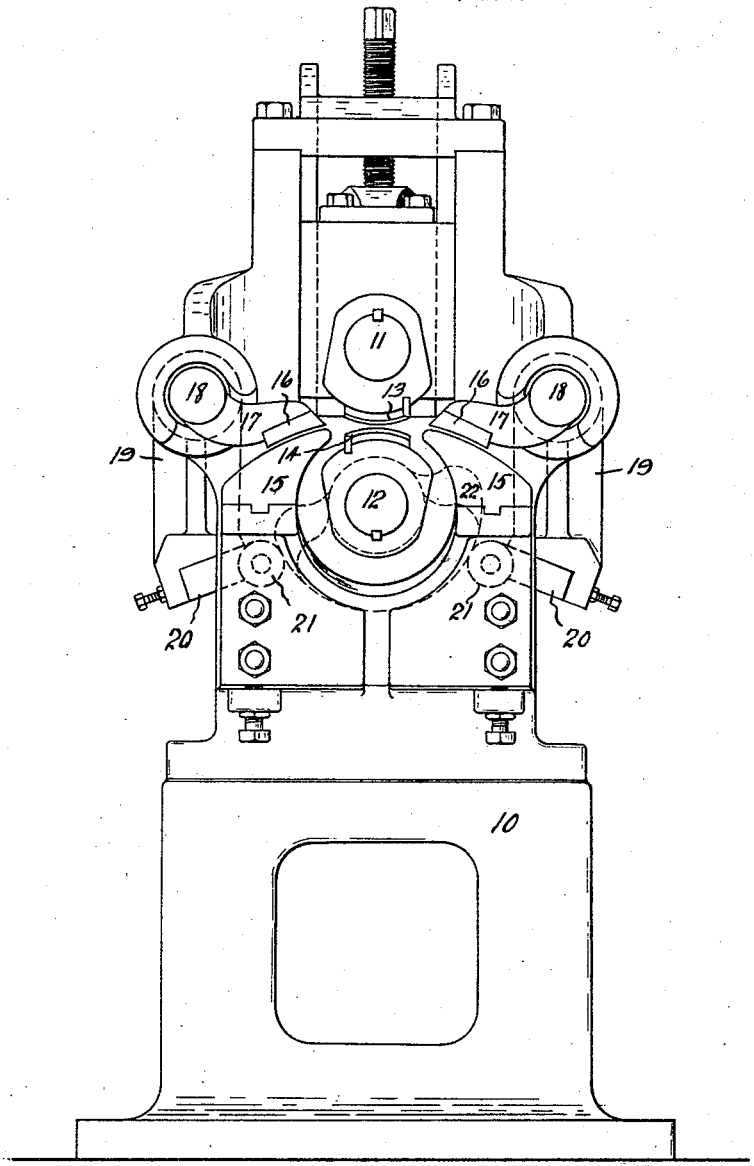
INVENTOR
W. R. Edwards
BY
Hull Smith Brock & West
ATT'YS Patented May 13, 1924.

1,493,483

UNITED STATES PATENT OFFICE.

WILLIAM R. EDWARDS, OF CLEVELAND, OHIO, ASSIGNOR TO HYDRAULIC STEEL COMPANY, OF CLEVELAND, OHIO, A CORPORATION OF OHIO.

CLAMPING MECHANISM FOR SHEARING MACHINES.

Application filed October 18, 1920. Serial No. 417,652.

*To all whom it may concern:*

Be it known that I, WILLIAM R. EDWARDS, a citizen of the United States, residing at Cleveland, in the county of Cuyahoga and State of Ohio, have invented a certain new and useful Improvement in Clamping Mechanism for Shearing Machines, of which the following is a full, clear, and exact description, reference being had to the accompanying drawings.

This invention relates generally to shearing machines employed for shearing off the burr formed upon the inner and outer faces of a rim or band during the process of electrically welding the ends of said rim or band; and more particularly to a novel clamping means employed in connection with said shearing machine for firmly holding the rim or band during the shearing operation.

The object of the invention is to provide a simple and efficient clamping mechanism, operable from and in unison with the shearing mechanism.

The invention consists in the novel features of construction and combination hereinafter fully described and set forth in the appended claims.

In the drawings forming a part of this specification, I have shown a rotary shearing machine provided with my novel form of clamping device.

Referring to the drawing, 10 indicates a suitable base upon which is mounted a shearing machine comprising the upper and lower rotary shafts 11 and 12 respectively, upon which are mounted the upper and lower shearing blades 13 and 14, respectively, and which operate to remove the burr upon the outer and inner faces of the rim or band (not shown) formed during the process of electrically welding the ends of the rim or band together.

The rim or band is placed between the shearing blades and upon the fixed spaced supports 15 and when the shearing blades are rotated in opposite directions, they will simultaneously operate upon the burrs upon the opposite faces of the rim or band, and in order to hold the rim or band against movement I employ two clamps 16, which engage the outer face of the rim upon opposite sides of the shears and press said rim down firmly upon the supports, the arms 17 carrying said clamps being carried upon rock shafts 18 mounted in the frame of the machine and provided with depending arms 19 which carry adjustable shoes 20 at their lower ends and each shoe is provided with a roller 21 at its inner end which rollers engage cams 22 mounted upon the shaft of the lower shear, said cams being so positioned and so shaped that at each revolution of the shears, the arms 19 will be forced outwardly throwing the clamps 16 inwardly and downwardly so as to firmly hold the rim while the shearing operation is being accomplished, and the moment said operation is completed, the cams will cease to operate upon the clamp arms, and the clamps will be released sufficiently to permit the easy withdrawal of the sheared rim.

It will thus be seen that I provide a simple, efficient and durable form of clamping mechanism capable of operating in the manner desired for accomplishing the objects hereinafter set forth.

Having thus described my invention, what I claim is:

1. The combination with a pair of rotary shears, of a pair of supports for a rim, a pair of clamps cooperating with said supports, shafts to which said clamps are connected, arms also connected to said shafts and cams upon one of the shear shafts engaging said arms as set forth.

2. The combination with a pair of shears, of a pair of supports for a rim, clamps cooperating with said supports, shafts to which said clamps are connected, arms connected also to said shafts, cams upon one of the shear shafts and adjustable shoes carried by the arms, and provided with rollers contacting with said cams.

In testimony whereof, I hereunto affix my signature.

WILLIAM R. EDWARDS.